Figure 2:
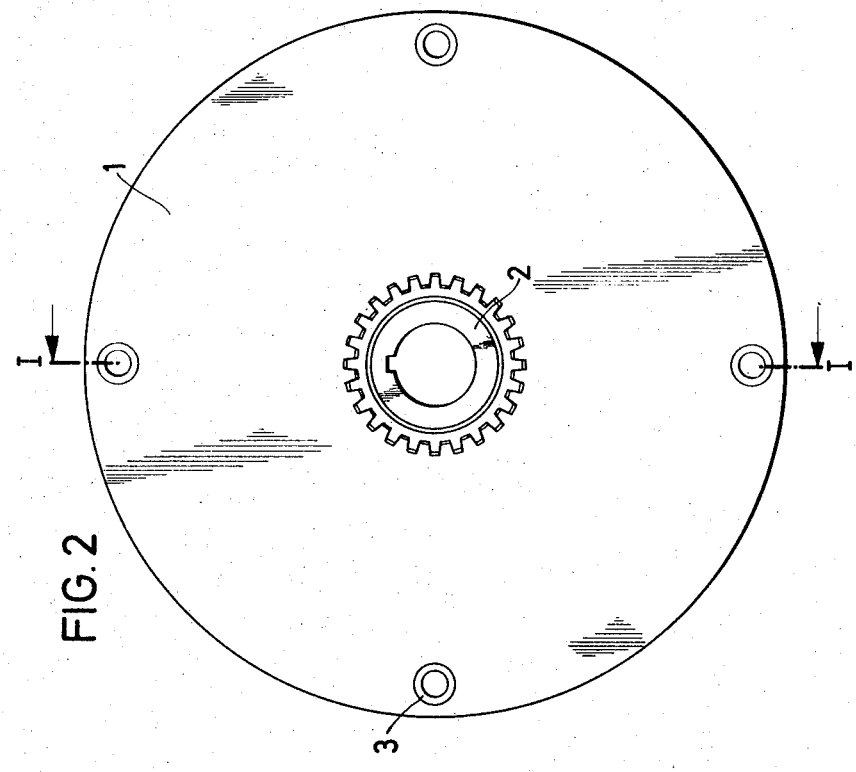

United States Patent
Symann

[11] 3,861,172
[45] Jan. 21, 1975

[54] COUPLING FOR COMBUSTION ENGINE

[75] Inventor: Heinz George Symann, Dortmund-Brakel, Germany

[73] Assignee: Kupplungstechnik GmbH, Hanover, Germany

[22] Filed: June 12, 1973

[21] Appl. No.: 369,245

[30] Foreign Application Priority Data
June 16, 1972 Germany.............................. 2229418

[52] U.S. Cl. ...................... 64/27 NM, 64/9, 64/14, 64/27 C, 192/84 C
[51] Int. Cl. ............................................. F16d 3/14
[58] Field of Search ...... 64/27 NM, 9, 14, 13, 15 C, 64/15 R, 27 C, 27 F, 27 R; 74/574, DIG. 10; 192/84 C

[56] References Cited
UNITED STATES PATENTS

| | | |
|---|---|---|
| 2,307,129 | 1/1943 | Hines et al. ..................... 64/27 NM |
| 2,683,380 | 7/1954 | Hutton ............................ 64/27 NM |
| 2,699,656 | 1/1955 | Anderson et al. ........................ 64/9 |
| 2,880,599 | 4/1959 | Hlinsky ..................................... 64/13 |
| 3,103,800 | 9/1963 | Kantar ............................. 64/27 NM |
| 3,148,660 | 9/1964 | Hiers ...................................... 116/133 |
| 3,568,468 | 3/1971 | Dechantsreiter et al. ................ 69/9 |
| 3,650,361 | 3/1972 | Fossum ............................ 192/84 C |

FOREIGN PATENTS OR APPLICATIONS

| | | |
|---|---|---|
| 1,174,114 | 7/1964 | Germany .................................. 64/9 |

*Primary Examiner*—Samuel Scott
*Assistant Examiner*—Randall Heald
*Attorney, Agent, or Firm*—Richards & Geier

[57] ABSTRACT

A tooth-type coupling for axial, radial and angular displacements of a driving and driven shaft comprises a flange of plastic material which flange is secured to a driving means and has a straight internal toothing. This toothing is engaged by an external toothing of a metallic coupling hub which hub has arc-shaped spherical teeth and is connected to the driven means.

2 Claims, 4 Drawing Figures

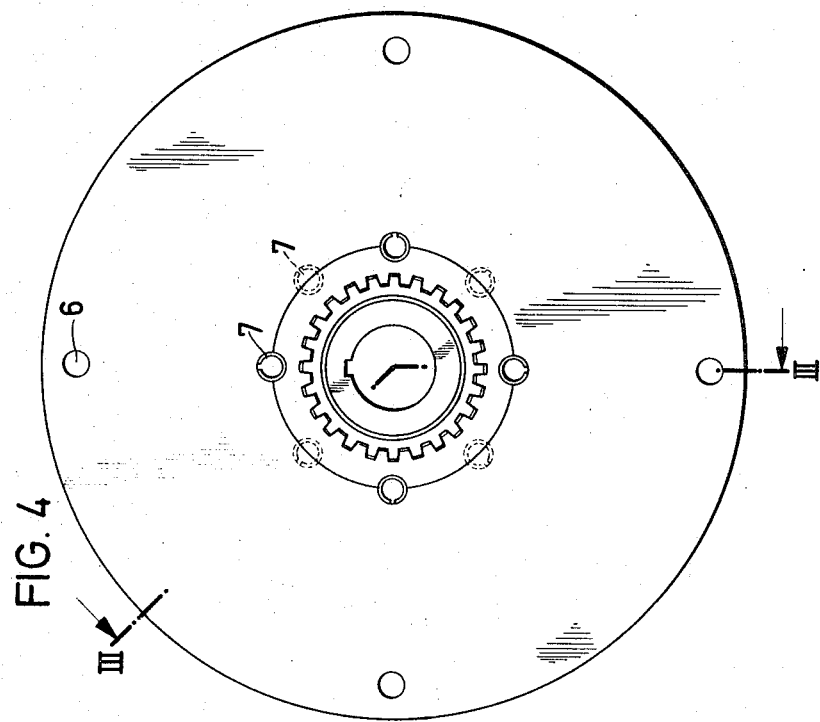
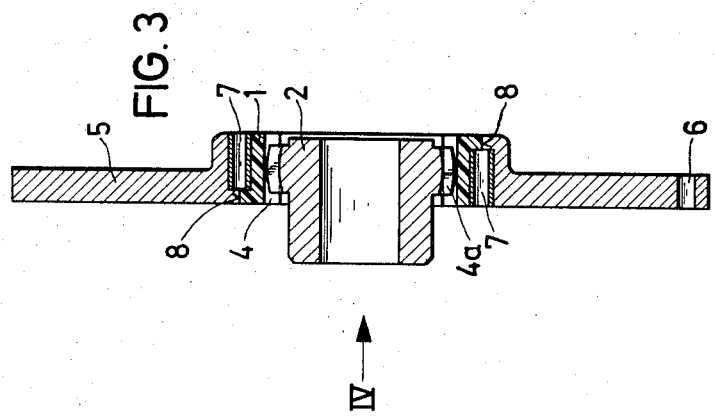

3,861,172

COUPLING FOR COMBUSTION ENGINE

The invention relates to a coupling for connecting the flywheel of a combustion engine to the shaft journal of a set or unit to be driven, whereby the coupling is composed of two parts, is maintenance-free and moveable in axial, radial and angular direction.

Flanged shaft couplings for connecting the shaft of a set to be driven to the driving flywheel are known which couplings are shaped as tooth coupling wherein the flange and the driving collar or hub are made of metal. These couplings present the disadvantage that the relative motions between the teeth surfaces of the driving side and the power take-off side requires lubrication to be effected since, otherwise, there is a danger of premature wear of the toothing, couplings of this type are, hence, not maintenance free or not adapted to accomodate axial, radial and angular displacements.

In other types of couplings of similar construction caps of plastic material are placed on the teeth of the driving or driven side so as to avoid the frictional interaction of steel on steel. Such types of couplings are not easy to manufacture. Moreover, they have the disadvantage that the multiplicity of plastic caps, constituted as separate parts, will complicate assembly operation and request an expenditure in the storage of parts. An additional disadvantage of the first mentioned tooth coupling made entirely of metal and of the coupling having plastic caps resides in that the wear and tear on the driving and driven collar will occur immediately and/or simultaneously after the plastic caps have been destroyed so that exchanging both parts will be unavoidable when effecting repair.

Moreover, couplings made of steel diaphragms are known which are screwed on the driving side with their outer circumference to the flywheel while, in the center, the hub part is mounted with or without radial play. Couplings of this type are difficult to mount since at the outset, the entire coupling is secured to the flywheel of the motor and, subsequently, the driven shaft can only be introduced into the hub of the coupling. An additional disadvantage constitutes the attachment of the hub to the diaphragm. If the hub is mounted free from play the diaphragm will be subject to a continuous bending strain, leading in a comparatively short time to a break through or rupture. Contrarwise, if the hub is attached to the diaphragm with radial play there is danger that the coupling will be destroyed by the high torsional vibrations due to the coefficient of cycle irregularily of the combustion engine, when the junction is undergoing deflection.

In other known types of couplings elastic material is arranged between the flanges of the flywheel and the hub on the driven side. Said material may be constructed in the form of bellows and screwed on to the hub with friction contact. If rubber is employed as elastic material, it is possible to have it vulcanized thereon both at the driving and the driven side or only on one side. The manufacture of couplings of this type is quite cumbersome and, hence, very expensive. Mounting is rendered very difficult by the screwing operation of said rubber bellows thereto. Furthermore, as additional disadvantage mention must be made of the exceedingly low dynamic stiffness against torsion, presenting the drawback with respect to vibrations when used to drive piston pumps. Still another known type of such an elastic coupling has been developed as disc coupling wherein at the outer circumference there are provided elastic bellows having a cam toothing and the flange to be screwed thereto having internally semicircular recesses. Into the cam toothing of the elastic ring rollers are inserted engaging at their outer circumference the semicircular recesses of the flange screwed, to the driven flywheel. At the driven side the coupling hub is attached with frictional contact to the elastic ring by means of screws. Manufacturing couplings of this latter type is also quite complicated and consequently, expensive, with the additional difficulty that they are difficult to mount. Moreover, they have a very low dynamic stiffness against torsion, which is in many cases an undesirable characteristic.

The great variety of coupling types described above shows the degree of difficulty which has to be coped with in order to produce a really simple yet reliable coupling which will overcome the aforementioned difficulties so as to satisfactorily transmit the power of a combustion engine to a set or aggregate to be driven.

It is, therefore, the aim to provide a coupling of the type initially and so designed to be of simple construction as well as economical to manufacture; and which coupling can be mounted in a simple and rapid manner. Furthermore, such a coupling shall be maintenance free and capable of axial, radial and angular movements. In addition, it must have a very high degree of dynamic stiffness against torsion.

The inventive solution is characterized by the provision of a flange which can be bolted to the flywheel of the combustion engine, which flange consists of a plastic material provided with a straight a inside toothing engaged by an exterial toothing with arc like teeth of the corresponding coupling hub made of metal which hub is secured to the shaft journal of the set or unit to be driven. In order to avoid excessive deformation of the synthetic material by the biasing force of the bolts or screws, the passage holes in the flange may be steel-bushed.

In a further development according to the invention it is proposed to provide, as need be, the flange as two concentric parts one resting within the other, the innner part of which consisting of plastic material having the inside toothing in the part and the outer part of which being made of metal. A torsion-proof connection may be established between both parts by bush-type spring elements capable to the inserted axially. As plastic material a non elastomeric thermoplastic material such as polyamide but also an acetal resin may be utilized.

Figure 1:
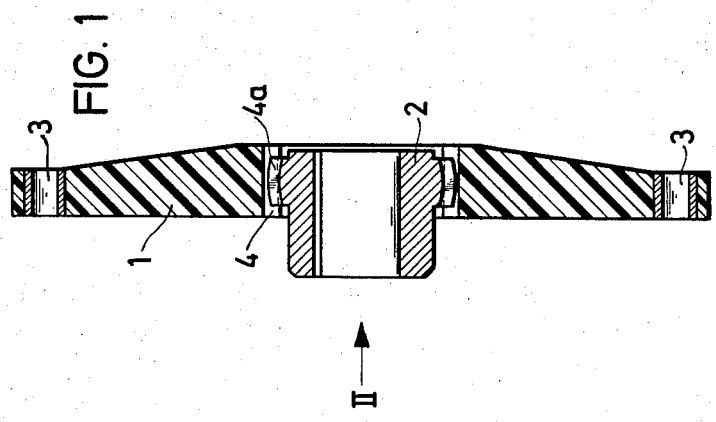

Two embodiments according to the invention are illustrated schmatically in the drawing wherein:

FIG. 1 is a cross sectional view of a coupling having a flange made entirely of plastic material, FIG. 2 is a front view of the coupling according to FIG. 1, FIG. 3 is a cross section of a coupling of two parts made of different material, and FIG. 4 is a front view of the coupling according to FIG. 3.

The embodiment shown in FIGS. 1 and 2 comprises a flange 1 made of plastic material and having a straight internal toothing 4 engaged by the external toothing 4a of the provided hub 2 with arc-type teeth. The flange 1 is bolted to the flywheel of a combustion engine (not shown). In order to avoid excessive deformation of the plastic due to the prestressing or biasing force of the bolts the passage holes in the flange 1 are sheathed in steel bushes 3.

The second embodiment according to FIGS. 3 and 4 consists in two flange parts 1 and 5 concentrically resting one within the other, with the internal part 1 formed as synthetic sleeve and the external part 5 as outer metal flange 5. Both of these are interconnected via sleeve-type spring elements 7. By means of the passage holes 6 the flange 5 is bolted to the flywheel of a motor. Via the metal flange 5, the sleeve elements 7 and the internal toothing 4 of the plastic sleeve 1 the torque of the motor is transmitted to the external toothing 4a of the hub part 2 and from hence to the shaft of the set to be driven.

The coupling according to the invention is of very simple construction because it consists essentially only of two parts, viz. of the flange and the hub. With large quantities of a specified size the flange may be made of a thermoplastic material die-casting, with the internal toothing and the through bores as well as the external centering may also be cast therewith provided allowance is made for adequate tolerance, thus rendering any subsequent machining operation superfluous. Merely, the through bores must be provided subsequently with normed steel bushes so as to avoid plastic deformation of the synthetic material due to the biasing force of the bolts when mounting to the flywheel of the motor. Making the coupling hubs of die-pressed parts may be achieved, likewise, in an economical manner by using corresponding machines, the coupling in its entirely constituting thus a very economical machine element.

It is known to have motors equipped with flywheels of different diameters. Since not every attachment combination permits large quantity production die-casting for the different flange dimensions is often economically not feasible. A problem of this type is solved by way of the embodiment shown in FIG. 4 and 3. Joining materials such as synthetics with metal brings about particular problems since in combustion engines heating of the coupling up to above 80° C may be expected, whereby the different coefficients of expansion of the materials become particularly effective. Furthermore, it is known that the thermoplastic materials will give off water when heated, due to their hydrophilic properties and will shrink after having been cooled so that the original registration or fit will not longer be correct. Since, however, combustion engines in the flow of the torque have often a high coefficient of cyclic irregularity it is necessary to provide for a play-free connection of the plastic sleeve 1 in the metal flange 5. For this reason the plastic sleeve 1 in the embodiment according to FIGS. 4 and 3 is pressed in the metal flange. Bores are introduced in the pitch circle between synthetic material and metal, which bores have radii lying both in the synthetic material and the metal. Slotted sleeve springs 7 under bias are driven into these bores. On account of their resilience the springs bridge the divergent material expansions and shrinkages as described above. A torque transmission free from play between the metal flange and the synthetic sleeve is assured in this way. The sleeve springs serve both to transmit torque and to compensate the expansion. With unfavourable diameter rations of the external diameter of the part 1 — according to FIG. 3 — formed as synthetic sleeve relative to the inside diameter of the toothing 4 it is possible for a reduction of the inside diameter 4 of the toothing 4 to arise due to the plastic deformation in the synthetic material as a consequence of the large radial forces by pressing the flange part made of synthetics and due to the prestressing forces of the spring elements 7 with the result that the hub 2 may then only be introduced into the coupling flange by the application of a great amount of force. Under these premises it is suitable to form the bores for accomodating the spring elements 7 alternatingly from the driving side and from the power take-off side as blind-end bores so that on the circumference of the flange part 1 a leg or strap 8 will remain respectively at the end of the bore to afford stabilisation.

When mounting, the flange is bolted with the internal straight toothing 4 to the flywheel of a motor. The hub 2 with the external toothing 4a is attached to the shaft butt of the power take-off side so that the parts to produce a frictional connection between the driving and driven side need only be slid into one another. A coupling of this type presents the additional advantage that for performing said sliding operation only a very small rotation of the driving and driven side is necessary when the internal teeth of the flange and the external teeth of the hub will happen to assume a position in front of each other. A more simple mounting operation than the one described is not conceivable. Since, despite careful machining, it must always be taken into account that the center lines of the driving and driven axes will not register, a relative movement on the connection between the driving and the driven side will accur during rotation of the sets. The point of connection is in the instant case the point of engagement of the toothings of the flange and hub of the coupling. In order to assure good antifriction properties and correspondingly low wear and tear without the use of lubricants the toothing of the flange and/or the entire flange was worked of plastic material whereby a thermoplastic substance was choosen presenting in connection with steel an ideal combination with respect to antifrictional properties. A combination of this type presents the additional advantage the wear and tear will essentially set in only with one of sliding parts, that is with the one made of synthetic material. The amount of wear depends on the extent of misalignment between the driving and driven axis and on the number of revolutions with which the set is operating and, consequently, on the rubbing speed between the pairs of teeth. In addition, the resistance to wear of the teeth is determined also by the amount of cyclic irregularity of the torque to be transmitted. In case the synthetic toothing will have been worn down after a correspondingly extended time of operation, it will only be necessary when effecting repair to exchange the synthetic part while the steel hub may continue in use.

It is not only possible for misalignments to arise, axial and radial plays may also occur at the crankshafts in combustion engines. The axial and radial back-lash will become larger in keeping with the duration of operation. The junction between the driving unit and the power take-off unit must therefore be mobile in axial, radial and angular direction. Since the present invention is concerned with the development of a tooth coupling operating as plug connection with sufficient axial play in its position of engagement without allowing the teeth to become disengaged, it is possible to effect axial displacements. In conjunction with the beneficial antifrictional properties of the material combination the restoring torques and bearing forces in the units are kept small. The radial mobility of the coupling results from the very small play between the teeth and manufacturing inaccuracy in the plastic toothing. The teeth will be deformed to the extent until they will all be leaded in uniformity. The addition of the play and the degree of deformation of the teeth are sufficient to permit radial mobility without giving rise to excessive forces of reaction. Since the toothing of the coupling hub has an arc-type and crowned or spherical profile end pressures are avoided in the tooth surfaces when in angular position one to another, thus keeping wear and tear as well as the forces of reaction at a low level.

In practice it has turned out to be justified as regards driving radial piston pumps and axial piston pumps via combustion engines that connecting elements are not to be formed so as to be torsion elastic. The oscillation behaviour at the pump may be effected by an excessively large angle of torque in the coupling to be so unfavourable that it will be worn down prematurely. A great number of building machines have been put out of order for this reason. With the coupling according to the invention the flange is made advantageously of nonelastomeric synthetic material. In this way the coupling is provided with such a high resistance to torque so that one can no longer speak of a torsion elastic coupling but of a flexible coupling. The torsion angle amount even at peak torque to no more than 1°. It is caused by a minute play between the teeth surfaces of the driving and driven side and the deformation of the synthetic teeth when the torque sets in. The teeth will be deformed, however, only to the extent unit all of them will interact uniformly. Moreover, no torsion angel was encountered in test trails.

What I claim is:

1. A tooth type coupling for connecting the flywheel of a combustion engine to the shaft journal of a unit to be driven, said coupling comprising a flange consisting of two concentrical parts, the inner part consisting of a synthetic material, the outer part consisting of a metal, bush-type spring elements extending axially between the two parts to provide a tension-proof connection between the parts, said inner part having a straight internal toothing, and a metallic coupling hub having an external toothing consists of arc-shaped and spherical teeth meshing with said internal toothing.

2. Coupling according to claim 1, characterized in that blind-end bores in alternating series are arranged on both sides of the flange for accomodating the spring elements.

* * * * *